2,905,587
INSECTICIDAL COMPOSITIONS

Robert J. Dowling, Naugatuck, Conn., assignor to United States Rubber Company, New York, N.Y., a corporation of New Jersey No Drawing. Application September 3, 1957
Serial No. 681,476

6 Claims. (Cl. 167—30)

This invention relates to improvements in insecticidal compositions containing a chloroalkyl aryloxyalkyl sulfite as the active ingredient.

Chloroalkyl aryloxyalkyl sulfites having the general formula

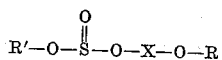
$$R'-O-\overset{O}{\underset{\|}{S}}-O-X-O-R$$

in which R' is a chloroalkyl radical containing 2 to 4 carbon atoms and 1 to 3 chlorine atoms and having no chlorine atom attached to the alpha carbon atom, X is an alkylene radical having 2 to 4 carbon atoms, and R is an aromatic radical, are known insecticides. Another designation for said sulfites is the di-esters of sulfurous acid wherein one of the esterifying groups is a chloroalkyl radical containing 2 to 4 carbon atoms and 1 to 3 chlorine atoms and having no chlorine atom attached to the alpha carbon atom, and the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms. These chloroalkyl aryloxyalkyl sulfites are disclosed in U.S. Patent No. 2,529,494 to Harris et al. granted November 14, 1950. Reference is made to said patent for illustrations of the various compounds. A commercial insecticide of the class is 2-(p-tert-butylphenoxy)-isopropyl 2-chloroethyl sulfite, known as Aramite. In the use of insecticidal compositions comprising Aramite and powdered solid carriers, viz., mineral silicates, such as clays, there have been some reports of injury to foliage and fruit. It is desired to reduce the possible phytotoxic effect of the chloroalkyl aryloxyalkyl sulfite insecticide.

I have found that the possible phytotoxic effect of chloroalkyl aryloxyalkyl sulfite in insecticidal compositions is substantially reduced by the inclusion in the insecticidal composition of sodium carboxymethylcellulose. Sodium carboxymethylcellulose, or sodium salt of carboxymethylcellulose is cellulose having sodium carboxymethyl ($CH_2COONa$) groups introduced into the cellulose molecule to bring about solubility in water. The product is manufactured by treating cellulose with alkali and then sodium monochloroacetate in known manner. Since each anhydroglucose unit in the cellulose structure contains 3 reactive hydroxyl groups with which the sodium monochloroacetate can react, theoretically complete reaction would mean the introduction of three sodium carboxymethyl groups per anhydroglucose unit. Such a completely reacted product would have a substitution of 3. Commercial sodium carboxymethyl cellulose, which is sold under the trade name "CMC," generally has substitution of 0.3 to 1.4 sodium carboxymethyl groups per anhydroglucose unit in the cellulose, and come in various viscosity types, from a viscosity in 2% concentration in water at 25° C. of 18 centipoises and below to 50 for the low viscosity types to a viscosity in 1% concentration in water at 25° C. of 1000 to 2800 centipoises and above for the high viscosity types, the medium viscosity types having viscosities in 2% concentration in water at 25° C. of 100 to 800 centipoises. Any of these various types of carboxymethylcellulose may be used in the present invention.

The following illustrates the invention. All parts and percentages referred to herein are by weight.

A composition comprising Aramite was prepared according to the formulation A, and a similar Aramite composition containing sodium carboxymethylcellulose was prepared according to the formulation B in the table below.

|  | Parts by weight | |
| --- | --- | --- |
|  | A | B |
| Aramite technical | 16.8 | 16.8 |
| Triton X-120 | 2.5 | 2.5 |
| Daxad-11 | 1.0 | 1.0 |
| CMC | 0.0 | 1.0 |
| Attaclay | 79.7 | 78.7 |

The "Aramite Technical" is 90% 2-(p-tert-butylphenoxy)-isopropyl 2-chloroethyl sulfite. The "Triton X-120" is an alkylated aryl polyether alcohol (non-ionic surface-active agent). The "Daxad-11" is the sodium salt of polymerized alkyl naphthalene sulfonic acid (anionic surface-active agent). The Triton X-120 and Daxad-11 are dispersing and wetting agents. The "CMC" was a high viscosity type sodium carboxymethylcellulose having a substitution of about 0.7 sodium carboxymethyl groups per anhydroglucose unit in the cellulose. The "Attaclay" is a clay. Other powdered mineral silicate carriers that may be used are mica, pumice, diatomite, talc and pyrophyllite. The sodium carboxymethylcellulose is generally used in amount from 1 to 50 parts per 100 parts of the chloroalkyl aryloxyalkyl sulfite, and the chloroalkyl aryloxyalkyl sulfite is generally in amount from 2 to 100 parts per 100 parts of the mineral silicate in formulations containing a powdered solid carrier.

Formulations A and B were each suspended in an amount of water to give a concentration of 1 part of 2-(p-tert-butylphenoxy)isopropyl 2-chloroethyl sulfite per 200 parts of water, and young tomato plants, of the Bonny Best variety, averaging four inches in height and without blossom or fruit, were sprayed with the water suspensions. The treated plants were placed in a high (100%) humidity chamber for 24 hours. Three days after removal from the chamber to ordinary greenhouse conditions, the treated plants were scored by visual examination of the percentage of the total foliage area that was injured. Type of injury scored was brown, necrotic, spotting of foliage. There was 22% injury in the case of the water suspension of formulation A and only 5% injury in the case of the water suspension of formulation B.

Similar tests with water suspensions of clay formulations containing 15% of active 2-(p-tert-butylphenoxy)-isopropyl 2-chloroethyl sulfite and zero, 1%, 2.5% and 5% of "CMC" based on the complete formulation showed 15%, 5%, 5.5% and 8% injury, respectively.

The carboxymethylcellulose does not reduce the insecticidal effectiveness of the chloroalkyl aryloxylalkyl sulfite as shown by the following test. Formulations A and B were each suspended in an amount of water to give a concentration of 1 part of 2-(p-tert-butylphenoxy)isopropyl 2-chloroethyl sulfite in 10,000 parts of water, and the suspensions were tested for mite control in the following manner: Rings of adhesive preparation non-toxic to the organisms under test, such as used on fly papers and for ringing trees, were placed around the borders of the upper surfaces of primary leaves of duplicate Broad Bean plants. Approximately 50 mites obtained from an existing two-spotted mite culture on other Broad Bean plants were transferred to each of the adhesive-ringed leaves. The following day one of the plants was sprayed for 40 seconds with the diluted formulation A and the other plant with the diluted formulation B. The plants were placed in the greenhouse and a primary count of the mites on the leaves was made as soon as the leaves were dry. Three days later a final count was made to determine the kill of the mites. The mite control was reported as percent mortality of the mites. The mite control in the case of the water suspension of formulation A was 64% and in the case of the water suspension of formulation B was 76%, showing no reduction in the insecticidal activity of the Aramite by virtue of the sodium carboxymethylcellulose.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An insecticidal composition comprising chloroalkyl aryloxyalkyl sulfite having the general formula $$R'-O-\overset{O}{\underset{\parallel}{S}}-X-O-R$$

in which R' is a chloroalkyl radical containing 2 to 4 carbon atoms and 1 to 3 chlorine atoms and having no chlorine atom attached to the alpha carbon atom, and X is an alkylene radical having 2 to 4 carbon atoms, and R is an aromatic radical, a powdered solid carrier, and sodium carboxymethylcellulose, said sodium carboxymethylcellulose being in amount from 1 to 50 parts per 100 parts of said sulfite, and said sulfite being in amount from 2 to 100 parts per 100 parts of said powdered solid carrier.

2. An insecticidal composition comprising chloroalkyl aryloxyalkyl sulfite having the general formula $$R'-O-\overset{O}{\underset{\parallel}{S}}-X-O-R$$

in which R' is a chloroalkyl radical containing 2 to 4 carbon atoms and 1 to 3 chlorine atoms and having no chlorine atom attached to the alpha carbon atom, and X is an alkylene radical having 2 to 4 carbon atoms, and R is an aromatic radical, a mineral silicate, and sodium carboxymethylcellulose, said sodium carboxymethylcellulose being in amount from 1 to 50 parts per 100 parts of said sulfite, and said sulfite being in amount from 2 to 100 parts per 100 parts of said mineral silicate.

3. An insecticidal composition comprising chloroalkyl aryloxyalkyl sulfite having the general formula $$R'-O-\overset{O}{\underset{\parallel}{S}}-X-O-R$$

in which R' is a chloroalkyl radical containing 2 to 4 carbon atoms and 1 to 3 chlorine atoms and having no chlorine atom attached to the alpha carbon atom, and X is an alkylene radical having 2 to 4 carbon atoms, and R is an aromatic radical, a clay, and sodium carboxymethylcellulose, said sodium carboxymethylcellulose being in amount from 1 to 50 parts per 100 parts of said sulfite, and said sulfite being an amount from 2 to 100 parts per 100 parts of said clay.

4. An insecticidal composition comprising 2-(p-tert-butylphenoxy)isopropyl 2-chloroethyl sulfite, a powdered solid carrier, and sodium carboxymethylcellulose, said sodium carboxymethylcellulose being in amount from 1 to 50 parts per 100 parts of said sulfite, and said sulfite being in amount from 2 to 100 parts per 100 parts of said powdered solid carrier.

5. An insecticidal composition comprising 2-(p-tert-butylphenoxy)isopropyl 2-chloroethyl sulfite, a mineral silicate, and sodium carboxymethylcellulose, said sodium carboxymethylcellulose being in amount from 1 to 50 parts per 100 parts of said sulfite, and said sulfite being in amount from 2 to 100 parts per 100 parts of said mineral silicate.

6. An insecticidal composition comprising 2-(p-tert-butylphenoxy)isopropyl 2-chloroethyl sulfite, a clay, and sodium carboxymethylcellulose, said sodium carboxymethylcellulose being in amount from 1 to 50 parts per 100 parts of said sulfite, and said sulfite being in amount from 2 to 100 parts per 100 parts of said clay.

References Cited in the file of this patent

UNITED STATES PATENTS

| | | |
|---|---|---|
| 2,614,061 | Coash | Oct. 14, 1952 |
| 2,710,822 | Golding et al. | June 14, 1955 |
| 2,745,782 | Stewart | May 15, 1956 |
| 2,759,300 | Hartley | Aug. 21, 1956 |
| 2,760,900 | Glenn et al. | Aug. 28, 1956 |